US011449020B2

(12) United States Patent
Weeks, Jr. et al.

(10) Patent No.: US 11,449,020 B2
(45) Date of Patent: Sep. 20, 2022

(54) CEILING FAN THAT CONTROLS THERMOSTAT BASED ON PRESENCE INFORMATION

(71) Applicant: Hubbell Incorporated, Shelton, CT (US)

(72) Inventors: Thomas Warren Weeks, Jr., Simpsonville, SC (US); Pritam Yadav, Greenville, SC (US); Brittany F. Reese, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/126,042

(22) Filed: Sep. 10, 2018

(65) Prior Publication Data
US 2019/0079479 A1    Mar. 14, 2019

Related U.S. Application Data

(60) Provisional application No. 62/558,477, filed on Sep. 14, 2017.

(51) Int. Cl.
| G05B 19/042 | (2006.01) |
| F04D 27/00 | (2006.01) |
| F04D 25/08 | (2006.01) |
| F24F 11/56 | (2018.01) |
| F24F 11/63 | (2018.01) |
| F24F 7/007 | (2006.01) |
| F24F 3/00 | (2006.01) |
| F24F 11/52 | (2018.01) |
| G10L 25/78 | (2013.01) |
| F04D 29/00 | (2006.01) |
| F24F 120/12 | (2018.01) |
| F24F 120/10 | (2018.01) |
| F24F 110/10 | (2018.01) |
| F24F 110/20 | (2018.01) |
| G05B 15/02 | (2006.01) |
| G06V 20/52 | (2022.01) |

(52) U.S. Cl.
CPC ........ G05B 19/042 (2013.01); F04D 25/088 (2013.01); F04D 27/004 (2013.01); F04D 27/007 (2013.01); F24F 3/00 (2013.01); F24F 7/007 (2013.01); F24F 11/56 (2018.01); F24F 11/63 (2018.01); F04D 29/005 (2013.01); F24F 11/52 (2018.01); F24F 2110/10 (2018.01); F24F 2110/20 (2018.01); F24F 2120/10 (2018.01); F24F 2120/12 (2018.01); G05B 15/02 (2013.01); G05B 2219/2614 (2013.01); G06V 20/52 (2022.01); G10L 25/78 (2013.01)

(58) Field of Classification Search
None
See application file for complete search history.

(56) References Cited

U.S. PATENT DOCUMENTS 8,228,184 B2 * 7/2012 Blakeley ............ H05B 47/115
340/539.1
8,864,447 B1 * 10/2014 Humphrey ............ F04D 17/04
415/118

(Continued)

Primary Examiner — Bernard G Lindsay
(74) Attorney, Agent, or Firm — Michael Best & Friedrich LLP

(57) ABSTRACT

A ceiling fan comprising an image capture device. The image capture device operable to capture one or more images depicting at least a portion of a room or area in which the ceiling fan is located.

10 Claims, 7 Drawing Sheets

(56) References Cited

U.S. PATENT DOCUMENTS

| | | | | |
|---|---|---|---|---|
| 10,001,288 B1* | 6/2018 | Yang | ......................... | F24F 11/62 |
| 2005/0276599 A1* | 12/2005 | Kajino | ................. | H04N 5/2252 |
| | | | | 396/419 |
| 2009/0278479 A1* | 11/2009 | Platner | ................. | H05B 47/175 |
| | | | | 315/312 |
| 2012/0274767 A1* | 11/2012 | Hornback | .............. | H04R 1/025 |
| | | | | 348/143 |
| 2013/0024027 A1* | 1/2013 | Lee | ....................... | F04D 27/001 |
| | | | | 700/275 |
| 2016/0261824 A1* | 9/2016 | Scalisi | .................... | H04N 7/142 |
| 2016/0363341 A1* | 12/2016 | Arens | ..................... | F24F 7/007 |
| 2017/0108236 A1* | 4/2017 | Guan | ..................... | H05B 47/105 |
| 2017/0318701 A1* | 11/2017 | Steiner | ............... | H05K 7/20209 |
| 2019/0003480 A1* | 1/2019 | Hall | ..................... | F04D 29/005 |

* cited by examiner

CEILING FAN THAT CONTROLS THERMOSTAT BASED ON PRESENCE INFORMATION

PRIORITY CLAIM

The present application is based on and claims priority to U.S. Provisional Application No. 62/558,477, titled "Ceiling Fan," having a filing date of Sep. 14, 2017, which is incorporated by reference herein.

FIELD

The present disclosure relates generally to ceiling fans.

BACKGROUND

A ceiling fan can circulate air within a room. When a person occupies the room, circulating the air via operation of the ceiling fan can increase evaporation of moisture from the person's skin. In this way, the person's body temperature can be lowered. In addition, a heating, ventilation, and air conditioning (HVAC) unit can be operated to raise or lower the temperature of the room. More specifically, the HVAC system can direct warm air or cool air into the room. In this way, the HVAC system can raise or lower the temperature of the room. Operation of the HVAC system can be controlled by a thermostat operable to compare the temperature of the room against a setpoint temperature for the room. When the temperature of the room deviates above or below the setpoint temperature, the thermostat can generate a control action to operate the HVAC system in either a cooling mode or a heating mode. The HVAC system can operate in the heating mode or the cooling mode until the temperature of the room return to the setpoint temperature.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a ceiling fan. The ceiling fan includes an image capture device. The image capture device is configured to capture one or more images depicting at least a portion of a room or area in which the ceiling fan is located.

Another example aspect of the present disclosure is directed to a method of determining presence of one or more persons in a room or area in which a ceiling fan is located. The method includes obtaining, at one or more computing devices, data from one or more data acquisition devices of the ceiling fan. The method further includes determining, by the one or more computing devices, whether the person is present in the room or area based, at least in part, on the data. The method further includes performing one or more control actions in response to determining the person is present in the room or area.

Yet another example aspect of the present disclosure is directed to a ceiling fan. The ceiling fan includes one or more fan blades. The ceiling fan further includes a motor operatively coupled to the one or more fan blades. The motor is configured to drive rotation of the one or more fan blades. The ceiling fan further includes an image capture device positioned below the one or more fan blades along a vertical direction. The image capture device is operable to capture one or more images depicting at least a portion of a room or area in which the ceiling fan is located. The ceiling fan includes a microphone operable to detect one or more audible sounds in the room or area.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the disclosure.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
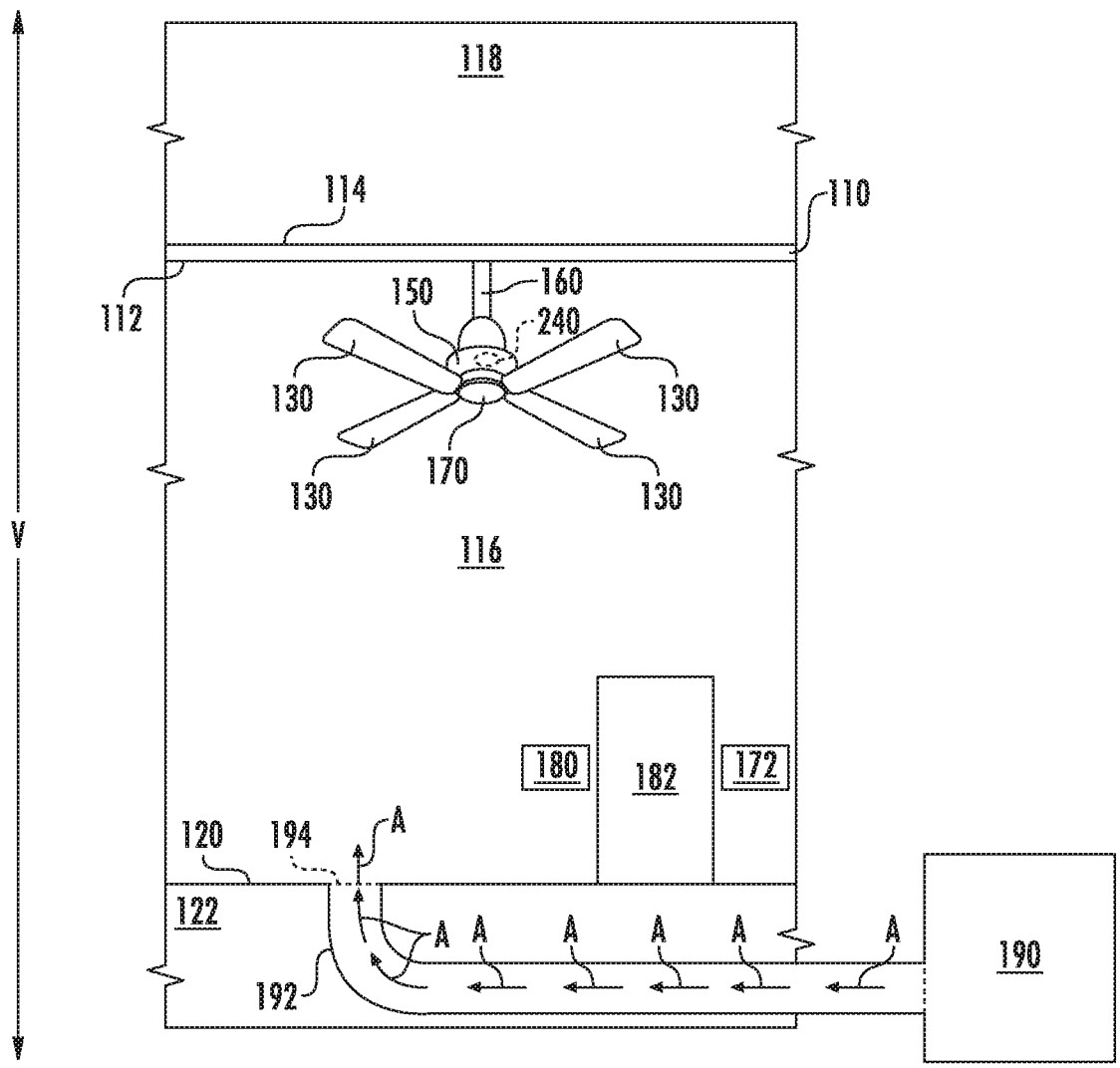
FIG. 1 provides a perspective view of a ceiling fan suspended from a ceiling according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a ceiling fan. The ceiling fan can include various data acquisition devices, such as a microphone and/or an image capture device. The microphone can capture audible sounds originating within a room or area in which the ceiling fan is located. In example embodiments, the audible sounds can be generated from a person or persons in the room. The image capture device can be configured to capture one or more images of at least a portion of the room. In some implementations, the at least a portion of the room can include a doorway through which a person enters or exits the room. In this way, the one or more images captured by the image capture device can depict one or more persons entering or exiting the room.

The ceiling fan can include one or more sensors operable to detect a parameter associated with at least one of the ceiling fan or the room. For instance, the sensor(s) can be configured to detect data indicative of an environmental parameter associated with the room. More particularly, the environmental parameter can include, without limitation, a temperature of the room, a humidity of the room, the presence of toxins (e.g., carbon monoxide), or any other suitable parameter indicative of the environment in the room.

The ceiling fan can include one or more computing devices. As used herein, the computing device(s) refer to components used to perform computations and can include controllers, one or more processors and one or more memory devices, etc. The computing device(s) can be in communication with the data acquisition device(s) and the sensor(s). In this way, the computing device(s) can receive one or more data signals from the data acquisition device(s) and the sensor(s). As will be discussed below, the computing device(s) can be configured to control operation of the ceiling fan based, at least in part, on the data signals.

In some embodiments, the computing device(s) can include a communication interface for communicating information (e.g., data signals collected from the sensor(s) and data acquisition devices) to other devices (e.g., servers, user devices, control systems, thermostat, etc.). For instance, the ceiling fan can stream or otherwise communicate image data captured by the image capture device and/or audio data captured by the microphone to a user device (e.g., smartphone, tablet, wearable device, etc.) or other device (e.g., control system, security system) for observation of the room by the user.

The ceiling fan can communicate directly with other devices (e.g., using peer-to-peer communication) and/or can communicate with other devices over a network. The network can be any suitable type of network, such as a local area network (e.g., intranet), wide area network (e.g., internet), low power wireless network (e.g., Bluetooth Low Energy (BLE), Zigbee, etc.), or some combination thereof and can include any number of wired or wireless links. In general, communication over the network can be implemented via any type of wired or wireless connection, using a wide variety of communication protocols, encodings or formats, and/or protection schemes.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), etc. Other suitable wired and/or wireless communication technologies can be used without deviating from the scope of the present disclosure.

In some implementations, the computing device(s) can be configured to perform one or more control actions based at least in part on data (e.g., data signals collected from the data acquisition devices) indicating presence of one or more persons in the room. For instance, the computing device(s) can be configured to communicate one or more control signals to a control system configured to control operation of one or more light sources in the room in which the ceiling fan is located. More specifically, the one or more control signals can cause the control system to activate (e.g. turn on) the one or more light sources. In this way, the one or more light sources can illuminate the room while it is occupied by the person. In example embodiments, the one or more light sources can include a light source of the ceiling fan. In other embodiments, the one or more light sources can be separate from the light source of the ceiling fan.

Alternatively or additionally, the computing device(s) can be configured to communicate one or more control signals to a control system configured to control operation of a motor configured to rotate one or more blades of the ceiling fan. More specifically, the one or more control signals can cause the control system to activate (e.g., turn on) the motor. In this way, the motor can drive rotation of the one or more blades to circulate air within the room.

In some implementations, the computing device(s) can be configured to perform one or more control actions based at least in part on data indicating presence of a person in the room and data (e.g., data signals collected from the sensors) indicating an environmental parameter (e.g., temperature) associated with the room or area. For instance, the computing device(s) can communicate one or more control signals to the control system to activate (e.g., turn on) the motor to drive rotation of the one or more fan blades. Furthermore, if the environmental parameter falls outside a range of predefined values, the computing device(s) can communicate one or more control signals to a thermostat configured to control operation of a HVAC system configured to heat or cool the room. The one or more control signals can command the thermostat to operate the HVAC system in either the heating mode or the cooling mode until the computing device(s) obtain data indicating the environmental parameter is within the range of predefined values.

In some implementations, the computing device(s) can be configured to perform one or more control actions based at least in part on data (e.g., data signals collected from the data acquisition devices) indicating the person is no longer present within the room. For instance, the computing device(s) can be configured communicate one or more control signals to the control system to deactivate (e.g., turn off) the one or more light sources. Alternatively or additionally, the one or more computing device(s) can be configured to communicate one or more control signals to the control system to deactivate (e.g., turn off) the motor to cease rotation of the one or more blades. More specifically, in some implementations, the computing device(s) can be configured to communicate the control signals to deactivate the one or more light sources and/or the motor after a predetermined amount of time has lapsed since the computing device(s) last obtained data indicating presence of the person in the room.

It should be appreciated that the computing device(s) can be configured to control operation of other suitable devices. For instance, the computing device(s) can communicate one or more control signals to a control system configured to adjust a position of window blinds in the room. More specifically, the one or more control signals can command the control system to adjust a position of the window blinds to or towards a fully open position or a fully closed position. In this way, an amount of natural light that enters the room can be controlled.

As used herein the use of the term "about" in conjunction with a numerical value is intended to refer to within 20% of the stated amount. The use of the term "obtaining" or "obtain" can include receiving, accessing, reading or otherwise obtaining data.

Figure 2:
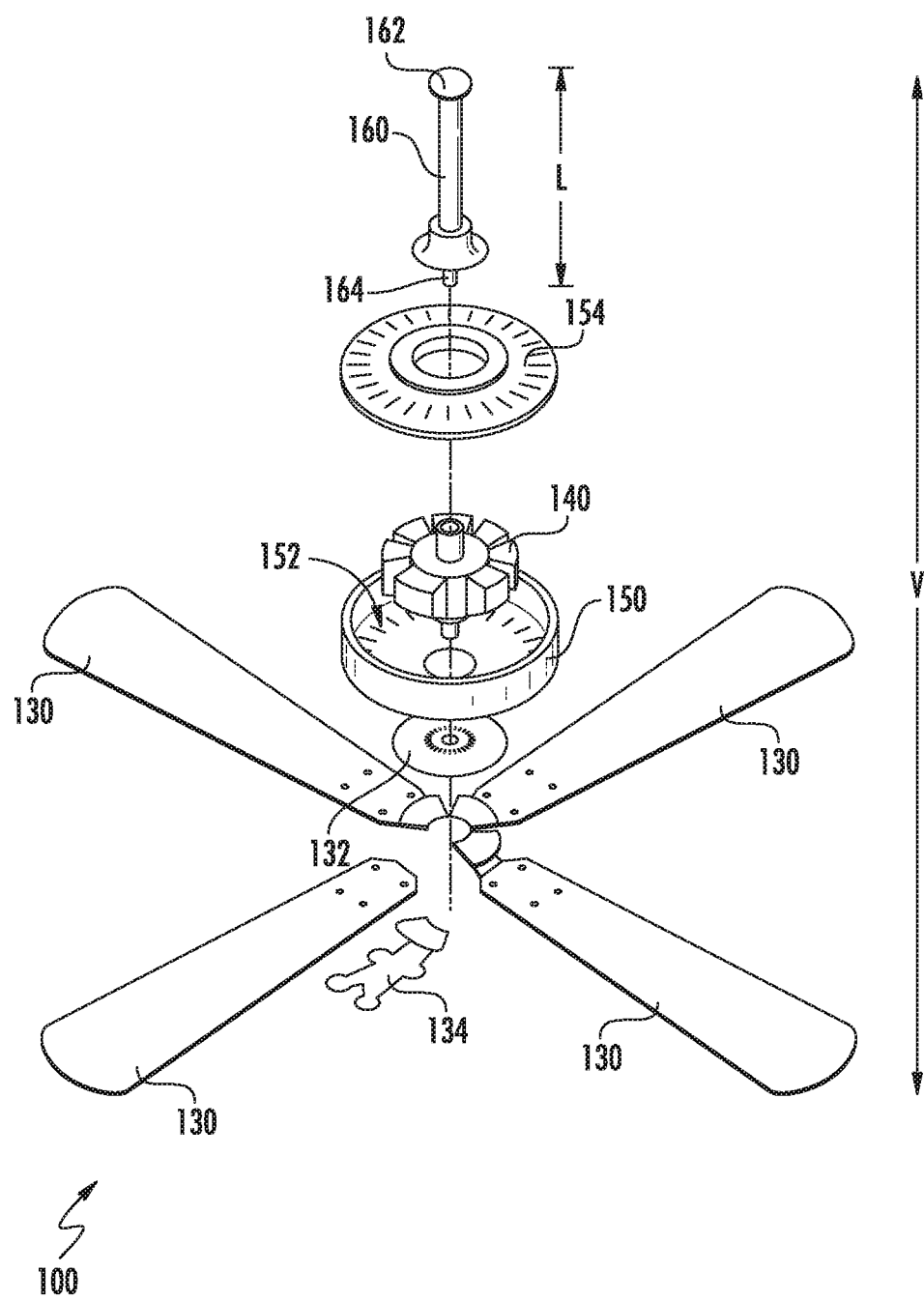
FIG. 2 provides an exploded view of a ceiling fan according to example embodiments of the present disclosure.
Figure 3:
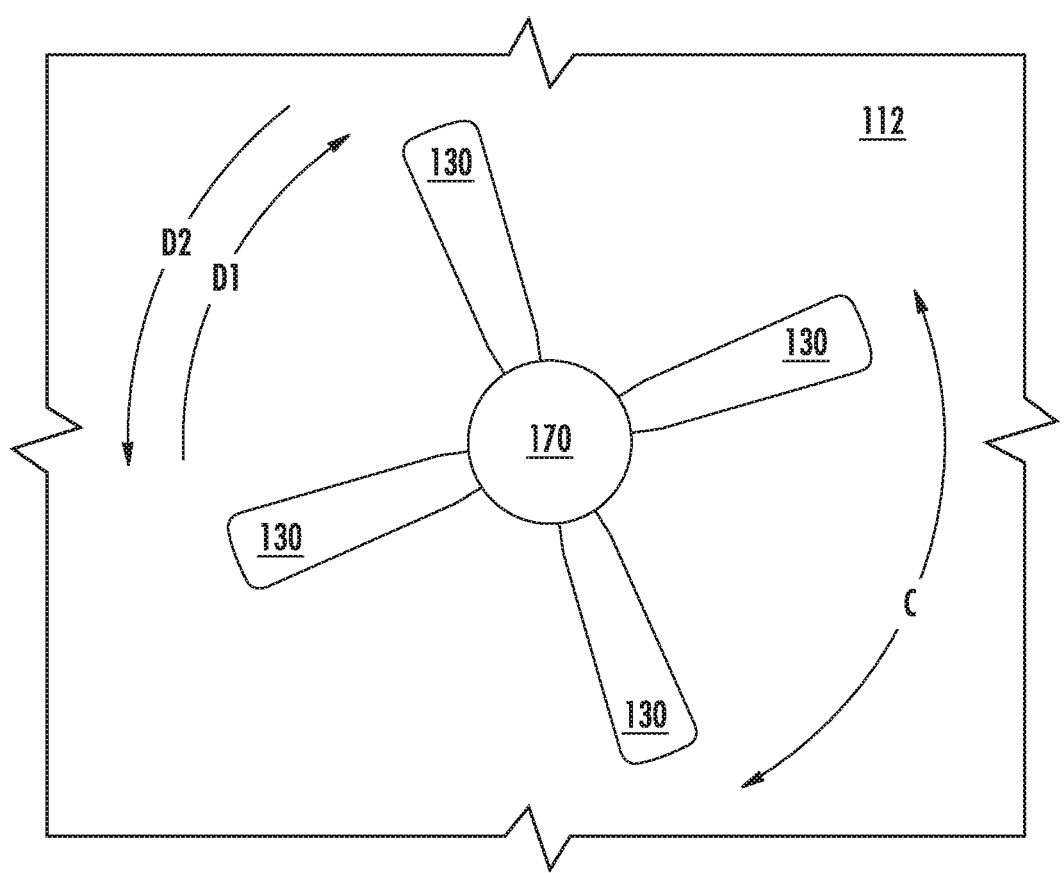
FIG. 3 provides a bottom-up view of a ceiling fan according to example embodiments of the present disclosure.

Referring now to the FIGS., FIGS. 1 through 3 depict a ceiling fan 100 according to example embodiments of the present disclosure. The ceiling fan 100 can be removably mounted to a ceiling 110 extending between a first surface 112 and a second surface 114 along a vertical direction V. As shown, the ceiling 110 can separate a first space 116 (e.g., positioned beneath the ceiling 110) from a second space 118 (e.g., positioned above the ceiling 110) along the vertical direction V. In addition, a floor 120 extending along a plane that is perpendicular to the vertical direction V can separate the first space 116 from a third space 122 (e.g., positioned below the floor 120). As such, the first space 116 can, as shown, be positioned between the second space 118 and the third space 122 along the vertical direction V. In some implementations, the first space 116 can include a room (e.g., kitchen, living room, etc.) of a residential home, and the second space 118 can include an attic positioned above the room. In addition, the third space 122 can include a crawlspace of the residential home.

In some implementations, the fan 100 can include a plurality of fan blades 130. Each blade of the plurality of blades 130 can be coupled to a blade hub 132. More specifically, the fan blades 130 can be coupled to the blade hub 132 so that the fan blades 130 are spaced apart from one another along a circumferential direction C. In some implementations, each fan blade 130 can be coupled to the blade hub 132 via a blade arm 134. For instance, the blade arm 134 can be coupled to one of the fan blades 130 and the blade hub 132 via any suitable mechanical fastener (e.g., screws).

In addition, the fan 100 can include an electric motor 140. More specifically, the motor 140 can be an alternating current (AC) motor or a direct current (DC) motor. In some implementations, the fan blades 130 can be rotatably coupled to the motor 140 via the blade hub 132. In addition, the motor 140 can receive electrical energy from a power source (e.g., a mains power supply) and can convert the electrical energy into mechanical energy needed to drive rotation of the fan blades 130 along the circumferential direction C. It should be appreciated that the electrical energy can be either alternating current (AC) power or direct current (DC) power. It should also be appreciated that rotating the fan blades 130 along the circumferential direction C can circulate air within the first space 116. As shown in FIG. 3, the fan blades 130 can rotate in a first direction $D_1$ or a second direction $D_2$. When the fan blades 130 rotate in the first direction $D_1$, the fan blades 130 can move air in the first space 116 towards the ceiling 110. However, when the fan blades 130 rotate in the second direction $D_2$, the fan blades 130 can move air in the first space 116 away from the ceiling 110. More specifically, the fan blades 130 can move air towards the floor 120.

In some implementations, the fan 100 can include a housing 150 configured to accommodate the motor 140. More specifically, the motor 140 can be positioned within a cavity 152 defined by the housing 150. In addition, the fan 100 can include a cover 154 that can be positioned on the housing 150. In this way, the motor 130 can be enclosed within the cavity 152 and hidden from view.

As shown, the fan 100 can be suspended from the ceiling 110 via a downrod 160 having a first end 162 and a second end 164. It should be appreciated that the first end 162 and the second end 164 can be spaced apart from one another along a length L of the downrod 160. In example embodiments, the first end 162 of the downrod 160 can be coupled to a support (e.g., mounting bracket) positioned within the ceiling 110 or the second space 118. In addition, the second end 164 of the downrod 160 can be coupled to the housing 150.

In some implementations, the fan 100 can include a light source 170 operable to illuminate the first space 116. For instance, the light source 170 can be included within a lighting fixture (not shown) that can be removably coupled to the housing 150 via any suitable mechanical fastener (e.g., screws). More specifically, the light source 170 can include an array of light emitting diodes (LEDs) light sources. It should be appreciated, however, that the light source 170 of the fan 100 can include any suitable light source configured to illuminate the first space 116 (e.g., room).

In some implementations, operation of the fan 100 can be controlled by a control system 172. More specifically, the control system 172 can include a wall-switch that can be manipulated to selectively couple the motor 140, the light source 170, or both to a power supply. In this way, the control system 172 can selectively activate (e.g., turn on) or deactivate (e.g., turn off) the light source 170. Alternatively or additionally, the control system 172 can selectively activate or deactivate the motor 140 to control rotation of the fan blades 130. In some implementations, the control system 172 can be configured to control operation of one or more light sources that are separate from the light source 170 of the fan 100. More specifically, the one or more light sources can be standalone lights mounted to the ceiling 110 or located at any other suitable location within the first space 116.

In some implementations, the control system 172 can control operation of other devices. For instance, the control system 172 can be configured to adjust a position of window blinds (not shown) in the room. More specifically, the control system can adjust a position of the window blinds to or towards a fully open position or a fully closed position. In this way, an amount of natural light entering the room through one or more windows can be controlled.

It should be appreciated that the present disclosure is not limited to the fan 100 described above with reference to FIGS. 1 through 3. For example, the fan can be a bladeless fan. In some implementations, the bladeless fan can be mounted to the ceiling 110. In alternative implementations, however, the bladeless fan can be a standalone unit. It should also be appreciated that the present disclosure is intended to cover ceiling fans suitable for outdoor environments, indoor environments, or both.

As shown in FIG. 1, the first space 116 can include a thermostat 180 positioned adjacent a doorway 182 through which a person can enter and exit the first space 116. In example embodiments, the thermostat 180 can control operation of a HVAC system 190 to cool or heat the first space 116. When the HVAC system 190 operates, air A can be directed through a ventilation duct 192 that extends from the HVAC system 190 and is positioned, at least in part, within the third space 122. As shown, the air A can exit the ventilation duct 192 at an aperture 194 defined by the floor 120. Stated another way, the air A within the ventilation duct 192 can enter the first space 116 via (e.g., through) the aperture 194.

In example embodiments, the thermostat 180 can operate the HVAC system 190 in either a heating mode or a cooling mode. When the HVAC system 190 operates in the cooling mode, a temperature of the air A entering the first space 116 via the aperture 194 can be less than a temperature of air that is currently within the first space 116. In this way, the temperature of the first space 116 can be lowered. When the HVAC system 190 operates in the heating mode, however, a temperature of the air A entering the first space 116 via the aperture 194 can be greater than the temperature of air that is currently within the first space 116. In this way, the temperature of the first space 116 can be increased.

Figure 4:
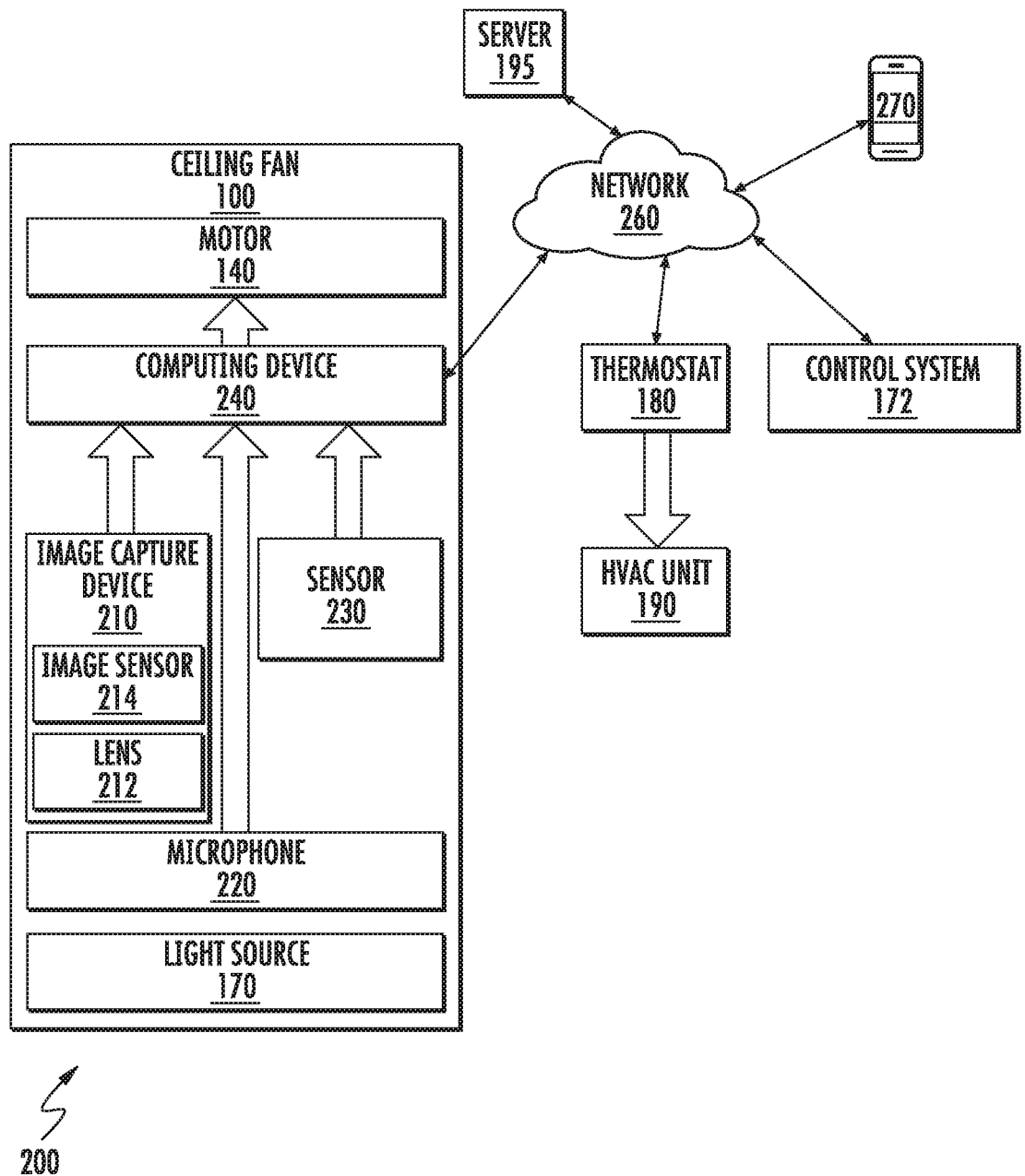
FIG. 4 provides a schematic view of a ceiling fan system according to example embodiments of the present disclosure.

FIG. 4 depicts a block diagram of components of a system 200 for a ceiling fan according to example embodiments of the present disclosure. As shown, the system 200 can include an image capture device 210 (e.g., camera) that is included as part of the fan 100. In some embodiments, the image capture device 210 can be above or below the fan blades 130 (FIG. 1) For instance, in some embodiments, the image capture device 210 can be positioned along the vertical direction V between the fan blades 130 (FIG. 1) and the floor 120 (FIG. 1). Alternatively, the image capture device 210 can be positioned along the vertical direction V between the fan blades 130 and the ceiling 110 (FIG. 1). In some embodiments, the image capture device 210 can be aligned with the fan blades 130 (FIG. 1) along the vertical direction V. It should be appreciated, however, that the image capture device 210 can be positioned at any suitable location on the fan 100 (FIGS. 1 and 2). For instance, the image capture device 210 can be coupled to or located within the housing 150 of the fan 100.

In some implementations, the image capture device 210 can include a lens 212 and an image sensor 214. The lens 212 can focus light (e.g., visible, infrared) onto the image sensor 214. More specifically, the lens 212 can focus light that is within a field of view of the lens 212. It should be appreciated that the field of view of the lens 212 can be any suitable value. For example, the lens 212 can be a panoramic lens having a field of view of about three hundred and sixty degrees (360°). In some embodiments, the lens 212 can be a fisheye lens. More specifically, the fisheye lens can have a field of view between about one hundred and fifty degrees (150°) and about one hundred and eighty degrees (180°).

The image sensor 214 can convert the light into an image depicting whatever is within the field of view of the lens 212. In example embodiments, a portion of the first space 116 can be within the field of view of the lens 212. More specifically, the portion of the first space 116 can include the doorway 182 through which a person enters and exits the first space 116. In this way, the image capture device 210 can capture one or more images (e.g., video) of a person entering or exiting the first space 116.

The system 200 can include a microphone 220. In some embodiments, the microphone 220 can be coupled to the housing 150. In other embodiments, the microphone can be positioned within the housing 150. It should be appreciated, however, that the microphone 220 can be positioned at any suitable location on the fan 100. In this way, the microphone 220 can detect audible sounds occurring in the room or area in which the fan 100 is located. The microphone 220 can convert the audible sounds to electrical signals indicative of the audio in the space.

The system 200 can also include one or more sensor(s) 230 operable to sense at least one environmental parameter of the first space 116. The sensor(s) 230 can be located on the fan 100. For instance, the sensor(s) 230 can be coupled to the housing 150 of the ceiling fan 100. It should be appreciated, however, that the sensor(s) 230 can be located at any suitable location on the fan 100.

In some implementations, the sensor(s) 230 can detect humidity (e.g., specific, relative, etc.) of the air within the first space 116. Alternatively or additionally, the sensor(s) 230 can detect a temperature of the air within the first space 116. It should be appreciated that the present disclosure is not limited to the environmental parameters (that is, humidity and temperature) discussed above. For example, the environmental parameter can include, without limitation, a carbon monoxide (CO) sensor and a radon gas sensor.

Figure 5:
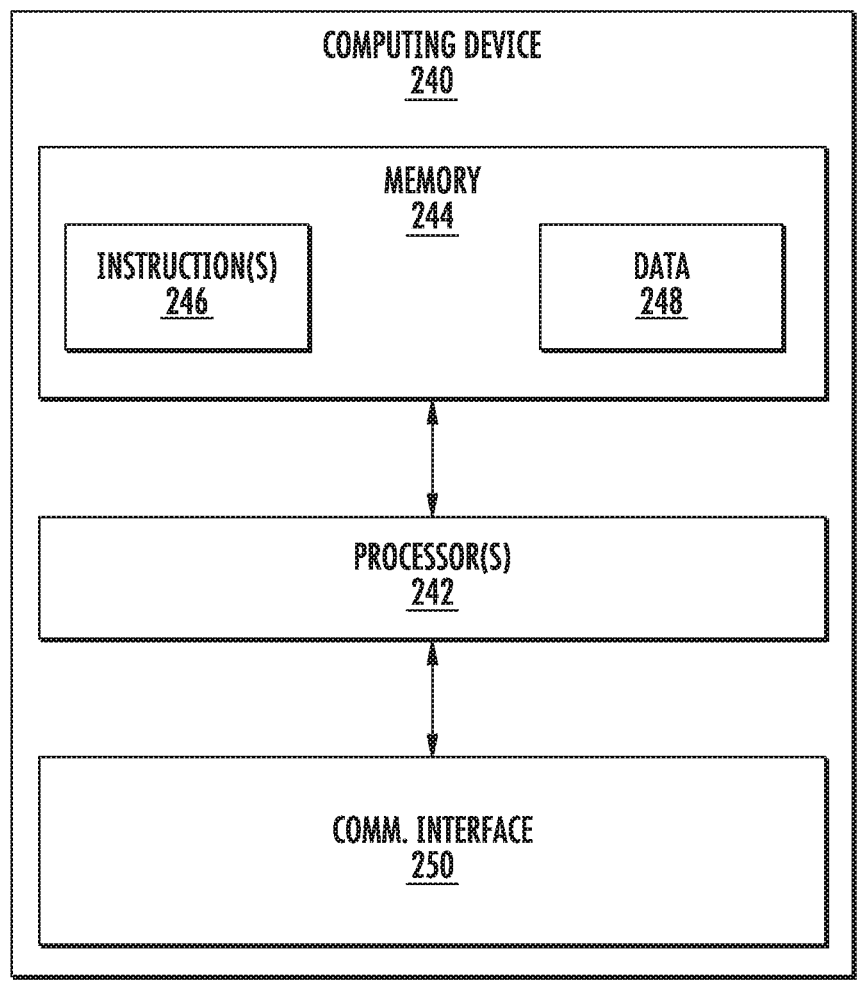
FIG. 5 provides a block diagram of an example computing device according to example embodiments of the present disclosure.

As shown, the system 200 can include one or more computing devices 240. In some implementations, the computing device(s) 240 can be coupled to or located within the housing 150 or other portion of the fan 100. FIG. 5 illustrates one embodiment of suitable components of the computing device(s) 240. As shown, the computing device(s) 240 can include one or more processors 242 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

In addition, the computing device(s) 240 can include a memory device 244. Examples of the memory device 244 can include computer-readable media including, but not limited to, non-transitory computer-readable media, such as RAM, ROM, hard drives, flash drives, or other suitable memory devices. The memory device 244 can store information accessible by the processor(s) 242, including computer-readable instructions 246 that can be executed by the processor(s) 242. The computer-readable instructions 246 can be any set of instructions that, when executed by the processor(s) 242, cause the processor(s) 242 to perform operations. The computer-readable instructions 246 can be software written in any suitable programming language or can be implemented in hardware. In some example embodiments, the computer-readable instructions 246 can be executed by the computing device(s) 240 to perform operations, such as generating one or more control actions to control operation of the ceiling fan 100. Alternatively or additionally, the computer-readable instructions 246 can be executed by the computing device(s) 240 to generate one or more control actions to control operation of one or more remote devices, such as the thermostat 180. In some embodiments, the computer-readable instructions 246 can be executed by the computing device(s) 240 to communicate information to one or more other remote devices.

The memory device 244 can further store data 248 that can be accessed by the computing device(s) 240. In example embodiments, the data 248 can include image data captured by the image capture device 210, data indicative of an environmental parameter detected by the sensor(s) 230, audible sounds detected by the microphone 220, or any combination thereof.

Additionally, as shown in FIG. 5, the computing device(s) 240 can include a communications interface 250. In example embodiments, the communications interface 250 can include associated electronic circuitry that can be used to communicatively couple the computing device(s) 240 with other devices, such as a user device 270, the thermostat 180, the control system 172, the server 195, or any other computing device. In some embodiments, the communication interface 250 can allow the computing device(s) 240 to communicate directly with other devices. In other embodiments, the communication interface 250 can provide for communication with other devices over a network 260.

The network 260 can be any suitable type of network. The network can be any suitable type of network, such as a local area network (e.g., intranet), wide area network (e.g., internet), low power wireless network (e.g., Bluetooth Low Energy (BLE), Zigbee, etc.), or some combination thereof and can include any number of wired or wireless links. In general, communication over the network can be implemented via any type of wired or wireless connection, using a wide variety of communication protocols, encodings or formats, and/or protection schemes.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), etc. Other suitable wired and/or wireless communication technologies can be used without deviating from the scope of the present disclosure.

In some implementations, the computing device(s) 240 can communicate with the control system 172 to activate (e.g., turn on) or deactivate (e.g., turn off) the light source 170 of the fan 100. Alternatively or additionally, the computing device(s) 240 can communicate with the control system 172 to activate or deactivate one or more light sources that are separate from the light source 170 of the fan 100. As will be discussed below in more detail, the computing device(s) 240 can be configured to activate one or more light sources based, at least in part, on data (e.g., data signals collected from the image capture device 210) indicating presence of one or more persons within the room or area in which the fan 100 is located.

In some implementations, the computing device(s) 240 can communicate with the control system 172 to activate or deactivate the motor 140 of the fan 100. In this way, rotation of the fan blades 130 can be controlled. In some implementations, the computing device(s) 240 can control operation of the image capture device 210 and the ceiling fan 100 independently of each other. For example, operation of the image capture device 210 and operation of the light source 170 can be controlled independently of each other. Alternatively or additionally, operation of the image capture device 210 and operation of the motor 140 can be controlled independently of each other. As will be discussed below in more detail, the computing device(s) 240 can be configured to activate the motor 140 of the fan 100 based, at least in part, on data (e.g., data signals collected from the image capture device 210) indicating presence of one or more persons within the room or area in which the fan 100 is located.

In some implementations, the computing device(s) 240 can communicate with the user device 270 over the network 260. The user device 270 can be any suitable type of device, such as, for example, a personal computing device (e.g., laptop or desktop), a mobile computing device (e.g., smartphone or tablet), a wearable computing device, an embedded computing device, a remote, or any other suitable type of user computing device. The user device 270 can include one or more computing device(s) with the same or similar components as described above with regard to computing device(s) 240 of the system 200. For instance, the computing device of the user device 270 can include one or more processors and one or more memory devices that store instructions that are executable by the computing device to cause user device 270 to perform operations, such as e.g., communicating one or more control signals over the network 260 to the computing device(s) 240 of the system 200. In this way, a user can control operation of the ceiling fan 100 via the user device 270. In addition, the user can use the user device 270 to control operation of the image capture device 210 and the ceiling fan 100 independently of each other. The user device 270 can also be used to control operation of other devices on the network 260, such as the thermostat 180.

In some embodiments, the computing device(s) 240 can communicate data to the user device 270 via communication interface 250. For instance, the computing device(s) 240 can communicate image data captured by the camera and/or audio data captured by the microphone to the user device 270. The information can be displayed (e.g., via a display device) or otherwise presented (e.g., via audio speakers) to the user through a suitable interface. In this way, a user can observe activity in a room or area in which the ceiling fan 100 is mounted.

In some embodiments, the computing device(s) 240 can communicate information (e.g., control signals) to a thermostat 180 or other components of the HVAC system 190. As discussed below, in an example implementation, the computing device(s) 240 can control operation of the HVAC system 190 based on signals from one or more data acquisition devices (e.g., image capture device 210, microphone 220) and/or sensors 230 of the system 200.

In some embodiments, the computing device(s) 240 can communicate with a remote computing device, such as a server 195 (e.g., a web server). For instance, the computing device(s) 240 can communicate data collected by the data acquisition devices (e.g., camera 210, microphone 220) and/or sensors 230 to the server 195. The server 195 can be configured to store a historical record of the data. It should be appreciated that the data stored on the server 195 can be accessed, for instance, by a user via a suitable interface (e.g., web browser) implemented on the user device 270.

In some implementations, the server 195 can be configured to process the data collected by the data acquisition devices (e.g., camera 210, microphone 220) and/or sensors 230. In addition, the server 195 can be configured to generate one or more control signals based on the processed data. The one or more control signals can be communicated to one or more devices over the network 260. In addition, the one or more control signals can command recipient devices to control operation of the ceiling fan 100, the image capture device 210, or both.

In some implementations, software for controlling operation of the ceiling fan 100, the system 200, or both can be transmitted over the network 260 to the computing device(s) 240. More specifically, the software can be stored in the memory device 244 and, when executed, can cause the computing device(s) 240 to control operation of the motor 140, the light source 170, the image capture device 210, or any combination thereof. In some implementations, updates to the software can be communicated over the network 260 to the computing device(s) 240. In this way, the software can be updated from a remote device (e.g., the server 195).

Figure 6:
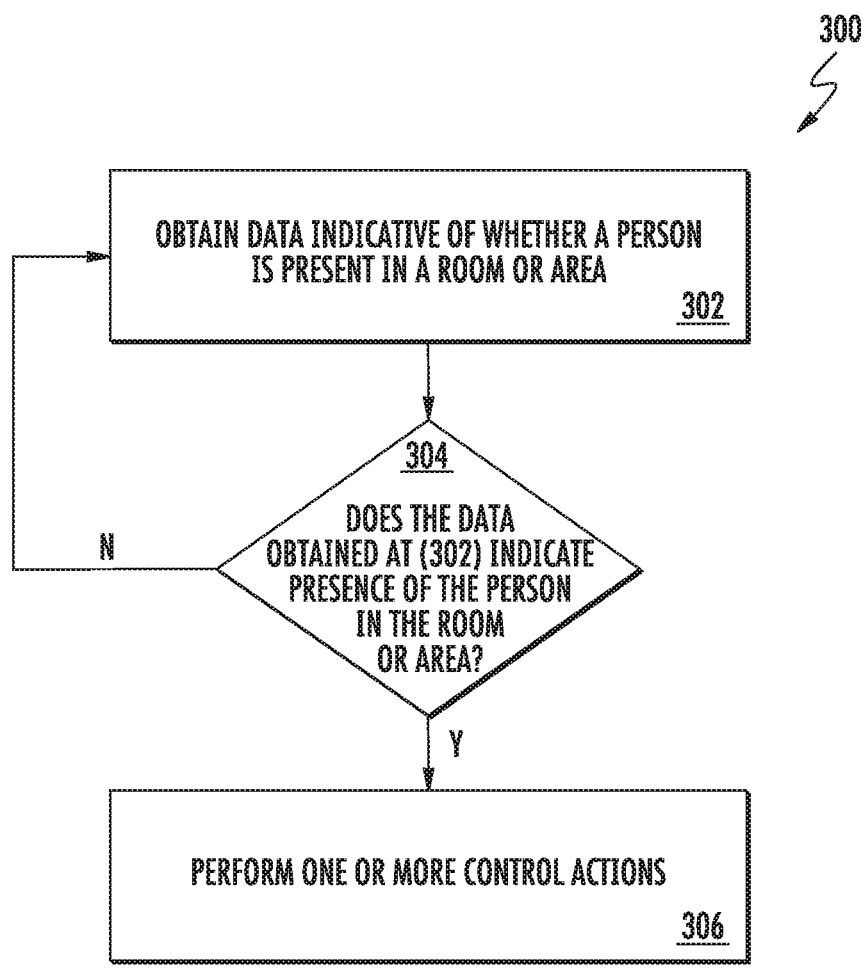
FIG. 6 provides a flow diagram of an example method according to example embodiments of the present disclosure.

Referring now to FIG. 6, a flow diagram of a method 300 of determining presence of one or more persons in a room or area in which a ceiling fan is located is provided according to example embodiments of the present disclosure. In general, the method 300 will be discussed herein with reference to the system 200 described above with reference to FIGS. 4 and 5. It should be appreciated that, although FIG. 6 depicts steps performed in a particular order for purposes of illustration and discussion, the method 300 discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (302), the method 300 can include obtaining, by one or more computing device(s), data from one or more data acquisition devices of the system, such as the image capture device and/or microphone discussed above with reference to FIGS. 4 and 5. In some implementations, the data can include image data indicative of one or more images captured by the image capture device of the ceiling fan system. Alternatively or additionally, the data can include audio data indicative of audible sounds detected by the microphone of the system.

At (304), the method 300 can include determining, by the computing device(s), whether the data indicates the presence of one or more persons in a room in which the ceiling fan is mounted. In some implementations, the computing device(s) can implement any suitable signal processing algorithm to determine whether the data obtained at (302) indicates the presence of one or more persons in the room. For instance, image recognition techniques can be performed on the images to recognize the presence of a person in the room. Any suitable image recognition technique (e.g., computer vision) can be implemented according to example aspects of the present disclosure. As non-limiting examples, image recognition techniques can include pixel analysis, machine-learned classifiers, etc. The image recognition techniques can be performed by computing device(s) located on the ceiling fan or communicated to a remote device (e.g., server) for processing.

When the computing device(s) determines the data obtained at (302) indicates presence of a person in the room, the method 300 proceeds to (306). Otherwise, the method 300 reverts to (302).

At (306), the method 300 can include performing, by the computing device(s), one or more control actions. In some implementations, the computing device(s) can communicate with a control system for the ceiling fan to control operation of the fan. For instance, the computing device(s) can communicate one or more control signals to the control system to activate (e.g., turn on) the light source of the fan. In this way, the light source can illuminate the room while the person is present within the room. In some embodiments, the computing device(s) can communicate one or more control signals to the control system to activate light sources other than the light source of the fan. Alternatively or additionally, the computing device(s) can communicate one or more control signals to the control system to rotate the fan blades in either the first direction or the second direction.

Figure 7:
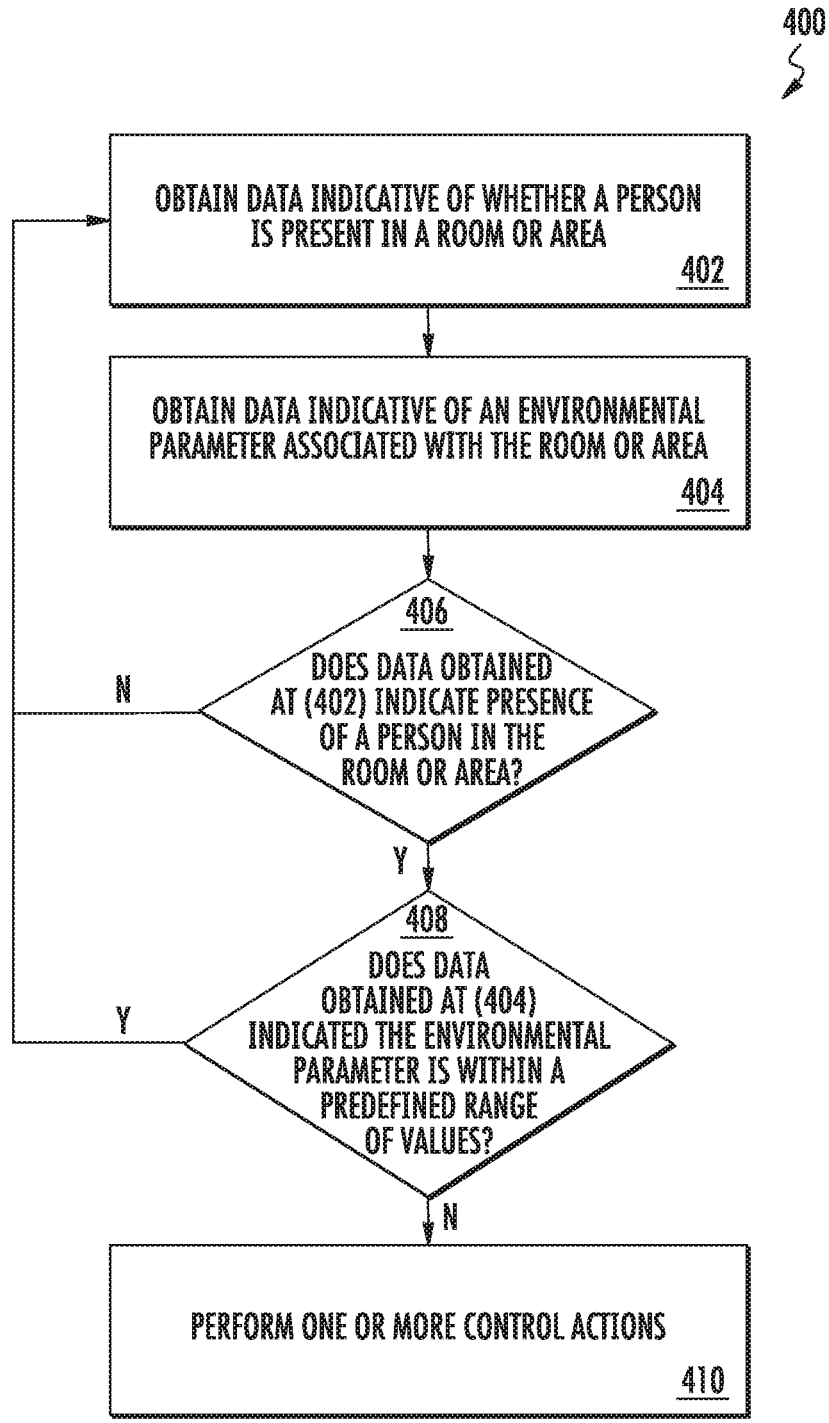
FIG. 7 provides a flow diagram of an example method according to example embodiments of the present disclosure.

Referring now to FIG. 7, a flow diagram of one example method 400 for controlling operation of one or more devices via a system for a ceiling fan is provided according to example embodiments of the present disclosure. In general, the method 400 will be discussed herein with reference to the ceiling fan 100 and the HVAC system 190 described above with reference to FIGS. 1 through 3. In addition, the method 400 will be discussed herein with reference to the system 200 described above with reference to FIGS. 4 and 5. However, it should be appreciated by those of ordinary skill in the art that the disclosed method 400 can generally be implemented with ceiling fans and HVAC systems having any other suitable configuration. In addition, although FIG. 7 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (402), the method 400 can include obtaining, by the computing device(s), data from one or more data acquisition devices of the ceiling fan system, such as the image capture device and/or microphone discussed above with reference to FIGS. 4 and 5. In some implementations, the data can include image data indicative of one or more images captured by the image capture device of the system for the ceiling fan. Alternatively or additionally, the data can include audio data indicative of audible sounds detected by the microphone of the system for the ceiling fan.

At (404), the method 400 can include obtaining, by the computing device(s), data from a sensor of the system for the ceiling fan. In some implementations, the sensor can be configured to detect an environmental parameter associated with a room in which the ceiling fan is mounted. For instance, the environmental parameter can include, without limitation, a temperature of the room, a humidity of the room, or any other suitable environmental parameter.

At (406), the method 400 can include determining, by the computing device(s), whether the data obtained at (402) indicates the presence of a person within the room or area. In some implementations, the computing device(s) can implement any suitable signal processing algorithm to determine whether the data obtained at (402) indicates the presence of a person within the room or area. For instance, image recognition techniques can be performed on the images to recognize the presence of a person in the room. Any suitable image recognition technique (e.g., computer vision) can be implemented according to example aspects of the present disclosure. As non-limiting examples, image recognition techniques can include pixel analysis, machine-learned classifiers, etc. The image recognition techniques can be performed by computing device(s) located on the ceiling fan or communicated to a remote computing device (e.g., server) for processing. When the computing device(s) determines the data obtained at (402) indicates the presence of a person within the first room or area, the method 400 proceeds to (408). Otherwise, the method 400 reverts to (402).

At (408), the method 400 can include comparing, by the computing device(s), the data indicative of the environmental parameter obtained at (404) against a range of approved (e.g., predefined) values for the environmental parameter. In example embodiments, the environmental parameter can indicate a temperature of the room, and the range of approved values can include temperature values that are no more than a predetermined number of degrees above or below a setpoint temperature for the room. For example, the range of approved temperature values can include temperature values that are no more than two degrees Fahrenheit (2° F.) above or below the setpoint temperature for the room. Thus, if the setpoint temperature is seventy-two degrees Fahrenheit (72° F.), then the range of approved temperature values for the first space can span from seventy degrees Fahrenheit (70° F.) to seventy-four degrees Fahrenheit (74° F.).

The computing device(s) can be configured to perform one or more control actions based on a comparison of the environmental parameter obtained at (404) against the range of approved values for the environmental parameter. In some implementations, the method 400 can revert to (402) when the environmental parameter (e.g., humidity, temperature) associated with the room is within the range of approved values. Alternatively, the method 400 can proceed to (410) when the environmental parameter (e.g., humidity, temperature) associated with the room falls outside the range of approved values for the environmental parameter.

At (410), the method 400 can include performing, by the computing device(s), one or more control actions. For instance, the computing device(s) can communicate one or more control signals over a network to a thermostat operable to control operation of a HVAC system used to heat or cool the room. When the environmental parameter obtained at (404) indicates a temperature of the room is less than a minimum value of the range of approved values for the environmental parameter, the one or more control signals can command the thermostat to operate the HVAC system in a heating mode. In contrast, when the environmental parameter obtained at (404) indicates a temperature of the room is greater than a maximum value of the range of approved temperature values, the one or more control signals can command the thermostat to operate the HVAC system in a cooling mode. In example embodiments, the HVAC system can operate in the heating mode or cooling mode until the environmental parameter is within the range of approved values.

Alternatively or additionally, the computing device(s) can, at (410), communicate one or more control signals to a control system configured to control operation of the ceiling fan. More specifically, the one or more control signals can command the control system to activate (e.g., turn on) the motor of the fan. In this manner, the motor, once activated, can drive rotation of one or more fan blades of the fan. In some implementations, the one or more control signals generated by the computing device(s) can command the control system to rotate the fan blades in either the first direction or the second direction. More specifically, the fan blades can be rotated in the first direction when the HVAC system is operating in the cooling mode. In contrast, the fan blades can be rotated in a second direction when the HVAC system is operating in the heating mode.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A ceiling fan, comprising:
a housing;
a motor positioned within the housing;
one or more fan blades rotatably coupled to the motor;
an image capture device positioned above the one or more fan blades along a vertical direction, the image capture device operable to capture one or more images, the one or more images depicting at least a portion of the room or area in which the ceiling fan is positioned;
one or more sensors configured to detect an environmental parameter associated with the room or area in which the ceiling fan is located; and,
one or more computing devices comprising one or more processors and one or more memory devices, the one or more memory devices storing instructions that, when executed by the one or more processors, cause the one or more processors to perform operations, the operations comprising:
determining that a first image from the one or more images indicates presence of a person in the room or area;
determining the environmental parameter falls outside a range of predefined values for the environmental parameter;
based on both the determination that the first image indicates the presence of a person within the room or area and the determination that the environmental parameter falls outside the range of predefined values, communicating one or more control signals to activate a thermostat operable to control operation of a heating, ventilation and air conditioning (HVAC) system configured to heat or cool the room or area in which the ceiling fan is located;
determining that a second image from the one or more images indicates the person is no longer present in the room or area; and,
based on the determination that the second image indicates that the person is no longer present within the room or area, communicating one or more control signals to deactivate the thermostat operable to control operation of a heating, ventilation and air conditioning (HVAC) system configured to heat or cool the room or area in which the ceiling fan is located.

2. The ceiling fan of claim 1, wherein performing one or more control actions comprises communicating, by the one or more computing devices, one or more control signals to a control system configured to control operation of one or more light sources configured to illuminate the room or area.

3. The ceiling fan of claim 1, further comprising:
a microphone operable to detect one or more audible sounds within the room or area.

4. The ceiling fan of claim 1, wherein the operations further comprise:
communicating the one or more images to a user device; and
communicating the one or more audible sounds to the user device.

5. The ceiling fan of claim 4, wherein the operations further comprise:
communicating the one or more images to a remote computing device configured to store a historical record of the one or more images.

6. The ceiling fan of claim 1, wherein the environmental parameter comprises at least one of:
a humidity of air within the room or area; and
a temperature of air within the room or area.

7. The ceiling fan of claim 1, wherein the image capture device comprises a lens and an image sensor, the lens operable to direct light onto the image sensor, the image sensor operable to convert the light focused thereon into the one or more images.

8. The ceiling fan of claim 7, wherein the light directed onto the image sensor comprises infrared light.

9. The ceiling fan of claim 7, wherein a field of view of the lens is three hundred and sixty degrees.

10. A ceiling fan, comprising:
a housing;
a motor positioned within the housing;
one or more fan blades rotatably coupled to the motor;
an image capture device positioned at least partially within the housing and above the one or more fan blades along a vertical direction, the image capture device operable to capture one or more images, the one or more images depicting at least a portion of the room or area in which the ceiling fan is positioned;

one or more sensors configured to detect an environmental parameter associated with the room or area in which the ceiling fan is located; and, one or more computing devices configured to communicate the one or more images and the detected environmental parameter to a remote server, the remote server comprising one or more processors and one or more memory devices, the one or more memory devices storing instructions that, when executed by the one or more processors, cause the one or more processors to perform operations, the operations comprising:

determining a first image from the one or more images indicates a presence of a person in the room or area;

determining that the environmental parameter falls outside a range of predefined values for the environmental parameter;

based on both the determination that the first image indicates a presence of a person within the room or area and the determination that the environmental parameter falls outside the range of predefined values, communicating to the one or more computing devices configured to cause the one or more computing devices one or more control signals to activate a thermostat operable to control operation of a heating, ventilation and air conditioning (HVAC) system configured to heat or cool the room or area in which the ceiling fan is located, determining that a second image from the one or more images indicates the person is no longer present in the room or area; and, based on the determination that the second image indicates that the person is no longer present within the room or area, communicating one or more control signals to the one or more computing devices configured to cause the one or more computing devices to deactivate the thermostat operable to control operation of a heating, ventilation and air conditioning (HVAC) system configured to heat or cool the room or area in which the ceiling fan is located.

* * * * *